(12) United States Patent
Berry et al.

(10) Patent No.: US 10,900,362 B2
(45) Date of Patent: Jan. 26, 2021

(54) INSERT SYSTEM FOR AN AIRFOIL AND METHOD OF INSTALLING SAME

(71) Applicant: General Electric Company, Schenectady, NY (US)

(72) Inventors: Jonathan Dwight Berry, Simpsonville, SC (US); Matthew Troy Hafner, Honea Path, SC (US); Russell Pierson DeForest, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 16/247,327

(22) Filed: Jan. 14, 2019

(65) Prior Publication Data
US 2020/0224540 A1 Jul. 16, 2020

(51) Int. Cl.
*F01D 5/18* (2006.01)
*F01D 9/04* (2006.01)

(52) U.S. Cl.
CPC ............ *F01D 5/189* (2013.01); *F01D 9/041* (2013.01); *F05D 2230/60* (2013.01); *F05D 2240/126* (2013.01); *F05D 2240/301* (2013.01); *F05D 2240/304* (2013.01); *F05D 2260/201* (2013.01)

(58) Field of Classification Search
CPC ...... F01D 5/188; F01D 5/189; F05D 2230/60; F05D 2240/301; F05D 2240/304; F05D 2260/201
See application file for complete search history.

(56) References Cited

U.S. PATENT DOCUMENTS

| | | | |
|---|---|---|---|
| 4,257,734 A * | 3/1981 | Guy | F01D 9/041 415/115 |
| 5,207,556 A | 5/1993 | Frederick et al. | |
| 6,318,963 B1 * | 11/2001 | Emery | F01D 5/186 416/96 A |
| 6,607,355 B2 | 8/2003 | Cunha et al. | |
| 2012/0219402 A1 * | 8/2012 | Harding | F01D 5/189 415/115 |
| 2014/0219788 A1 * | 8/2014 | Nilsson | B23P 11/02 415/175 |
| 2016/0201487 A1 * | 7/2016 | Spangler | F01D 9/02 415/115 |
| 2019/0234236 A1 * | 8/2019 | Spangler | F01D 5/189 |
| 2019/0345829 A1 * | 11/2019 | Anderson | F01D 5/189 |

FOREIGN PATENT DOCUMENTS

EP 2573325 3/2013

* cited by examiner

*Primary Examiner* — Igor Kershteyn
(74) *Attorney, Agent, or Firm* — Armstrong Teasdale LLP

(57) ABSTRACT

An insert system for an airfoil plenum includes a first insert and a second insert that include a plurality of impingement openings defined therein. The first insert includes a forward-facing inlet opening. The second insert includes a neck portion having a radial-facing inlet opening, an aft opening, and a cavity in flow communication between the radial-facing inlet opening and the aft opening. The second insert is sized for insertion into the plenum radially through a plenum inlet such that the neck portion is positioned in the plenum inlet. The first insert is sized for insertion into the second insert radially through the radial-facing inlet opening. When the neck portion is positioned in the plenum inlet, the first insert is moveable aftward through the aft opening into an installed position such that the forward-facing inlet opening opens into the cavity.

17 Claims, 7 Drawing Sheets

INSERT SYSTEM FOR AN AIRFOIL AND METHOD OF INSTALLING SAME

FEDERAL RESEARCH STATEMENT

This invention was made with Government support under contract number Contract No. DE-FE0023965 awarded by the Department of Energy (DOE). The government has certain rights in this invention.

BACKGROUND

The field of the disclosure relates generally to cooling of airfoils and, more specifically, to inserts for impingement cooling of rotary machine components.

In at least some known rotary machines, energy is extracted from a gas stream in a turbine which powers a mechanical load. During operation of the rotary machine, various hot gas path components are subjected to the high-temperature gas stream, which can induce wear in the hot gas path components. For example, air is pressurized in a compressor and mixed with fuel in a combustor for generating the stream of high-temperature gases. Generally, higher temperature gases increase performance, efficiency, and power output of the rotary machine. Thus, at least some known hot gas path components are cooled to facilitate operation of the rotary machine with the increased high-temperature gas streams. However, higher temperature gases can also increase thermal stresses and/or thermal degradation of the rotary machine components.

Some known hot gas path components include an airfoil with an internal cooling system, wherein a cooling fluid, such as bleed air extracted from a compressor or steam, is forced through plenums defined within the airfoil. This forced cooling facilitates the hot gas path components functioning in the high-temperature gas stream. At least some known plenums include an inlet opening and integrated components or inserts with a plurality of impingement openings. These components or inserts allow the cooling fluid channeled into the plenum through the plenum inlet opening to be directed by the impingement openings to impingement upon the internal surfaces of the airfoil, thus increasing the cooling of the internal components of the airfoil. However, at least some known integrated components with impingement openings cannot be easily replaced, because removal and replacement of some known integrated components would require disassembly and/or replacement of the entire airfoil. Additionally, at least some known removable inserts have a limited range for insertion depth into the plenum, as they are constrained by the dimensions of the inlet opening of the plenum. As such, these inserts may not provide for effective impingement cooling of the internal surfaces of some portions of the airfoil.

BRIEF DESCRIPTION

In one aspect, an insert system for an airfoil is provided. The airfoil includes a plenum that extends into an aft portion of the airfoil. The plenum includes a plenum inlet, and an entirety of the plenum inlet is defined axially forward of the aft portion. The insert system includes a first and second insert. The first insert includes a forward-facing inlet opening. The second insert includes a neck comprising a radial-facing inlet opening defined therein, an aft opening, and a cavity in flow communication between the radial-facing inlet opening and the aft opening. The first insert and the second insert comprise a plurality of impingement openings defined therein. The second insert is sized for insertion into the plenum radially through the plenum inlet such that the neck portion is positioned in the plenum inlet. The first insert is sized for insertion into the second insert radially through the radial-facing inlet. When the neck portion is positioned in the plenum inlet, the first insert is moveable aftward through the aft opening into an installed position such that the forward-facing inlet opening opens into the cavity.

In another aspect, a gas turbine system is provided. The gas turbine system includes a compressor section, a combustion section, and a turbine section. The combustion system is coupled in flow communication with the compressor section. The turbine section is coupled in flow communication with the combustion system. The turbine section includes an airfoil, a first insert, and a second insert. The airfoil includes a plenum that extends into an aft portion of the airfoil. The plenum includes a plenum inlet. An entirety of the plenum inlet is defined axially forward of the aft portion. The first insert is positioned within the plenum and includes a first main body portion and a forward-facing inlet opening. The second insert is positioned within the plenum and includes a neck portion positioned in the plenum inlet. The neck portion includes a radial-facing inlet opening defined therein. The second insert also includes an aft opening. The first insert extends through the aft opening such that the first main body portion extends into the aft portion. The first insert and the second insert include a plurality of impingement openings defined therein.

In another aspect, a method of installing an insert system into an airfoil is provided. The airfoil includes a plenum that extends into an aft portion of the airfoil. The plenum includes a plenum inlet. An entirety of the plenum inlet is defined axially forward of the aft portion. The method includes inserting a second insert radially through the plenum inlet into the plenum such that a neck portion of the second insert is positioned in the plenum inlet. A radial-facing inlet of the second insert is defined in the neck portion. The second insert includes an aft opening. The method further includes inserting a first insert radially into the second insert through the radial-facing inlet opening. The method also includes moving the first insert aftward through the aft opening into an installed position. The first insert and the second insert include a plurality of impingement openings defined therein.

DRAWINGS

These and other features, aspects, and advantages of the present disclosure will become better understood when the following detailed description is read with reference to the accompanying drawings in which like characters represent like parts throughout the drawings, wherein.

Figure 1:
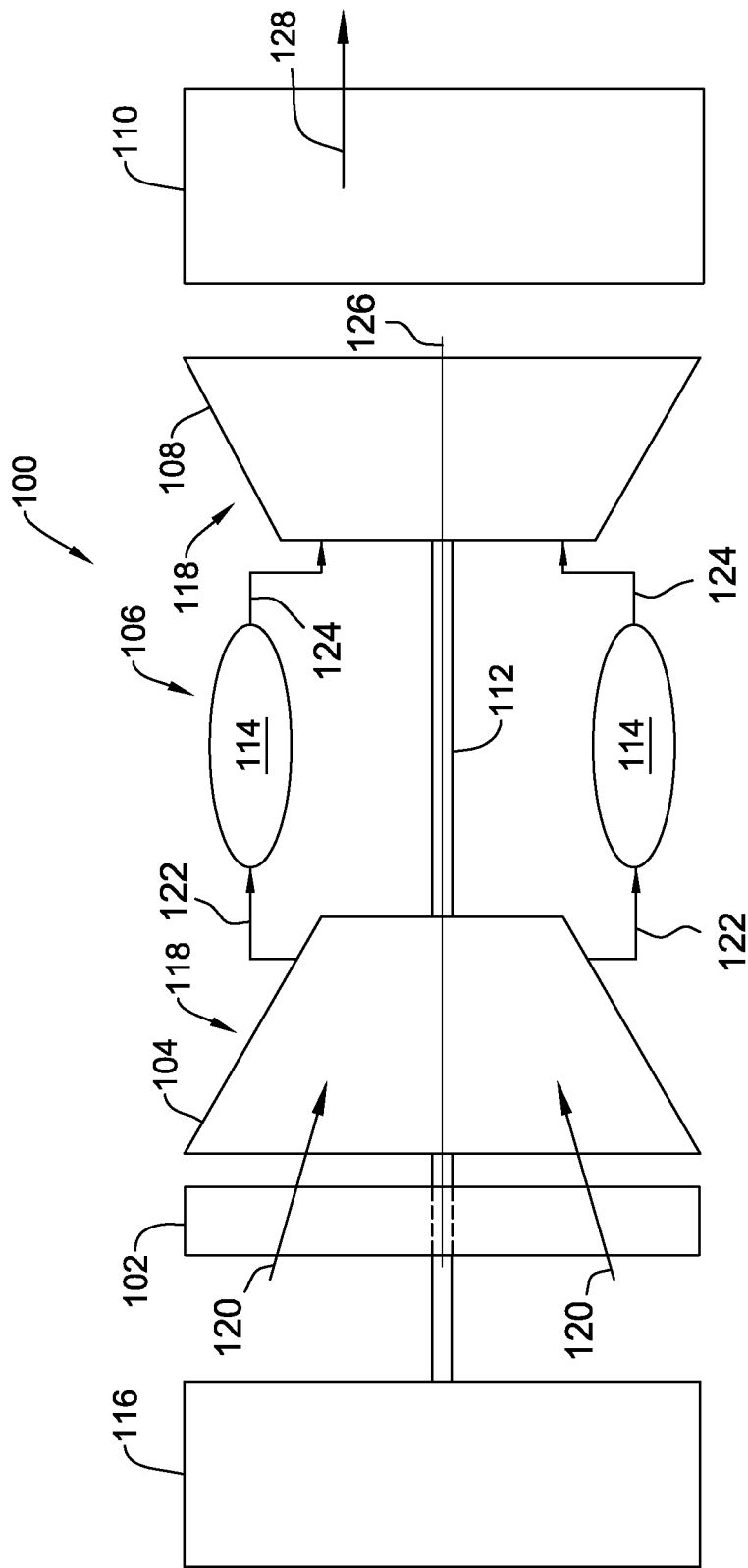
FIG. 1 is a schematic view if an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine.

The systems described herein relate to cooling components of a rotary machine using an insert system and methods of installing the same. Specifically, in the exemplary embodiment, the component includes an airfoil. The airfoil includes a plenum that extends into an aft portion of the airfoil and includes a plenum inlet opening. The plenum inlet opening is configured to receive a cooling fluid for internal cooling of the airfoil. An entirety of the plenum inlet opening is defined axially forward of the aft portion. The insert system includes a first insert and a second insert each having impingement openings defined therethrough. The second insert is insertable radially into the plenum through the plenum inlet opening. The second insert includes a radial-facing inlet opening, an aft opening, and a cavity defined therebetween. The first insert is insertable radially through the radial-facing inlet opening of the second insert and into the cavity, such that the first insert is nested within the second insert. The first insert is then moveable aftward within the cavity and through the aft opening into an installed position, such that a portion of the first insert extends aftwardly within the plenum into the aft portion of the airfoil, and a forward-facing inlet of the first insert opens into the cavity of the second insert. In operation, the cooling fluid channeled to the plenum inlet of the airfoil is received through the radial-facing inlet opening of the second insert and into the cavity. A first portion of the received cooling fluid flows through the impingement openings of the second insert, and a second portion of the received cooling fluid flows through the forward-facing inlet into the first insert and then through the impingement openings of the first insert. Thus, the insert system facilitates effective impingement cooling of the portion of the airfoil that extends aft of the plenum inlet. Additionally, the insert system facilitates ease of installation into the airfoil and, in some embodiments, ease of removal from the airfoil for repair and replacement.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

In operation, intake section 102 channels air 120 towards compressor section 104. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Combustion gases 124 are channeled downstream towards turbine section 108 and impinge upon turbine blades (not shown), converting thermal energy to mechanical rotational energy that is used to drive rotor assembly 118 about a longitudinal axis 126.

Often, combustor section 106 and turbine section 108 are referred to as a hot gas section of turbine engine 100. Exhaust gases 128 then discharge through exhaust section 110 to ambient atmosphere.

Figure 2:
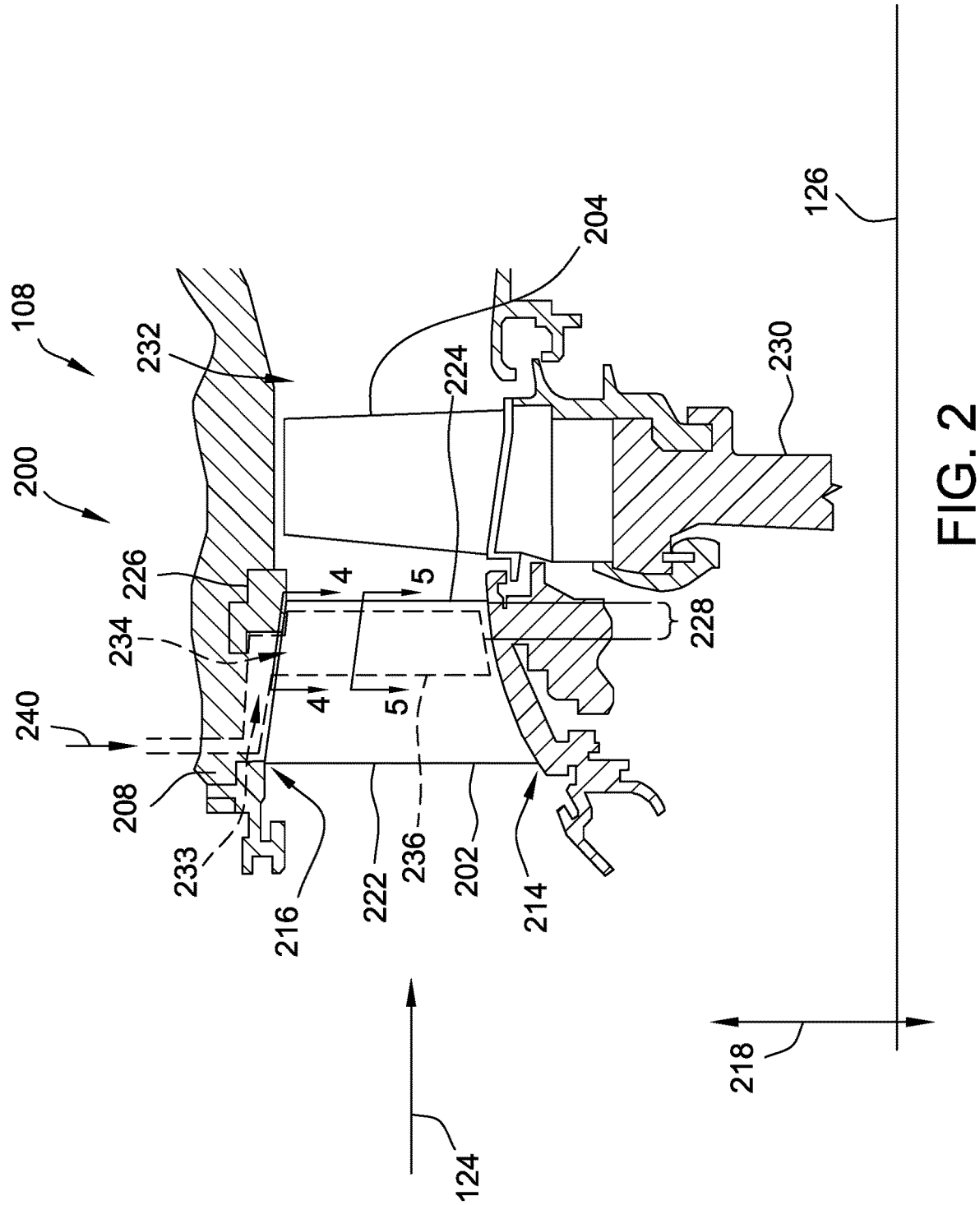
FIG. 2 is an enlarged schematic view of an exemplary turbine stage of the rotary machine shown in FIG. 1.

FIG. 2 is an enlarged schematic view of an exemplary turbine stage 200 of turbine engine 100 (shown in FIG. 1). Stage 200 includes a plurality of radially extending stationary airfoils 202 circumferentially spaced around longitudinal axis 126, and a plurality of radially extending rotating airfoils 204 downstream from stationary airfoils 202 and circumferentially spaced around longitudinal axis 126. Each rotating airfoil 204 is coupled to rotor shaft 112 (shown in FIG. 1) via a disk 230, and extends radially outward towards a casing 208.

In the exemplary embodiment, each stationary airfoil 202 includes a first end 216 coupled to casing 208 of turbine section 108, and extends radially inward to a second end 214 along a radial direction 218. For example, stationary airfoil 202 is coupled to casing 208 via an aft supporting flange or hanger 226. Additionally, each stationary airfoil 202 extends axially from a leading edge 222 downstream to an opposing trailing edge 224. During operation, stationary airfoils 202 and rotating airfoils 204 are positioned within a hot gas flow path 232, such that a flow of high temperature combustion gases 124 is channeled therethrough, exposing outer surfaces of stationary airfoils 202 and rotating airfoils 204 to high temperatures and potential corresponding thermal stresses and/or thermal degradation. To mitigate such thermal effects, an interior cavity or plenum 236 is defined within stationary airfoil 202, i.e., between a pressure side wall 210 and an opposite suction side wall 212 (shown in FIG. 4) of stationary airfoil 202, to facilitate internal impingement cooling of an interior surface of the outer walls. For example, plenum 236 is defined at least partially by interior surfaces of pressure side wall 210 and suction side wall 212 (shown in FIG. 4) of stationary airfoil 202. Plenum 236 is in flow communication with a coolant supply channel 233 via a plenum inlet 234 defined in stationary airfoil 202 at first end 216. In the exemplary embodiment, coolant supply channel 233 channels a cooling fluid 240, such as a flow of pressurized bleed air from compressor section 104 (shown in FIG. 1), towards plenum inlet 234. Alternatively, cooling fluid 240 is a suitable fluid other than air. The term fluid as used herein includes any medium or material that flows, including, but not limited to, air and steam.

In the exemplary embodiment, stage 200 is a first stage of turbine section 108, and stationary airfoils 202 define a first stage turbine nozzle immediately downstream from combustor section 106 (shown in FIG. 1). In alternative embodiments, stage 200 is any suitable stage of turbine section 108. In the exemplary embodiment, plenum 236 extends axially aftward into an aft portion 228 of stationary airfoil 202. An entirety of plenum inlet 234 is defined forward of aft portion 228, i.e., plenum inlet 234 does not extend axially over aft portion 228, which limits an ability of known systems to direct cooling fluid from coolant supply channel 233 for effective impingement on the interior surface of the outer walls of aft portion 228. For example, aft portion 228 extends for a substantial length, or "overhangs," directly beneath aft supporting flange 226, which precludes plenum inlet 234 from extending directly over aft portion 228. In some embodiments, such an overhang is required for stationary airfoils 202 to implement a desired turning angle in a first stage of turbine section 108.

Figure 3:
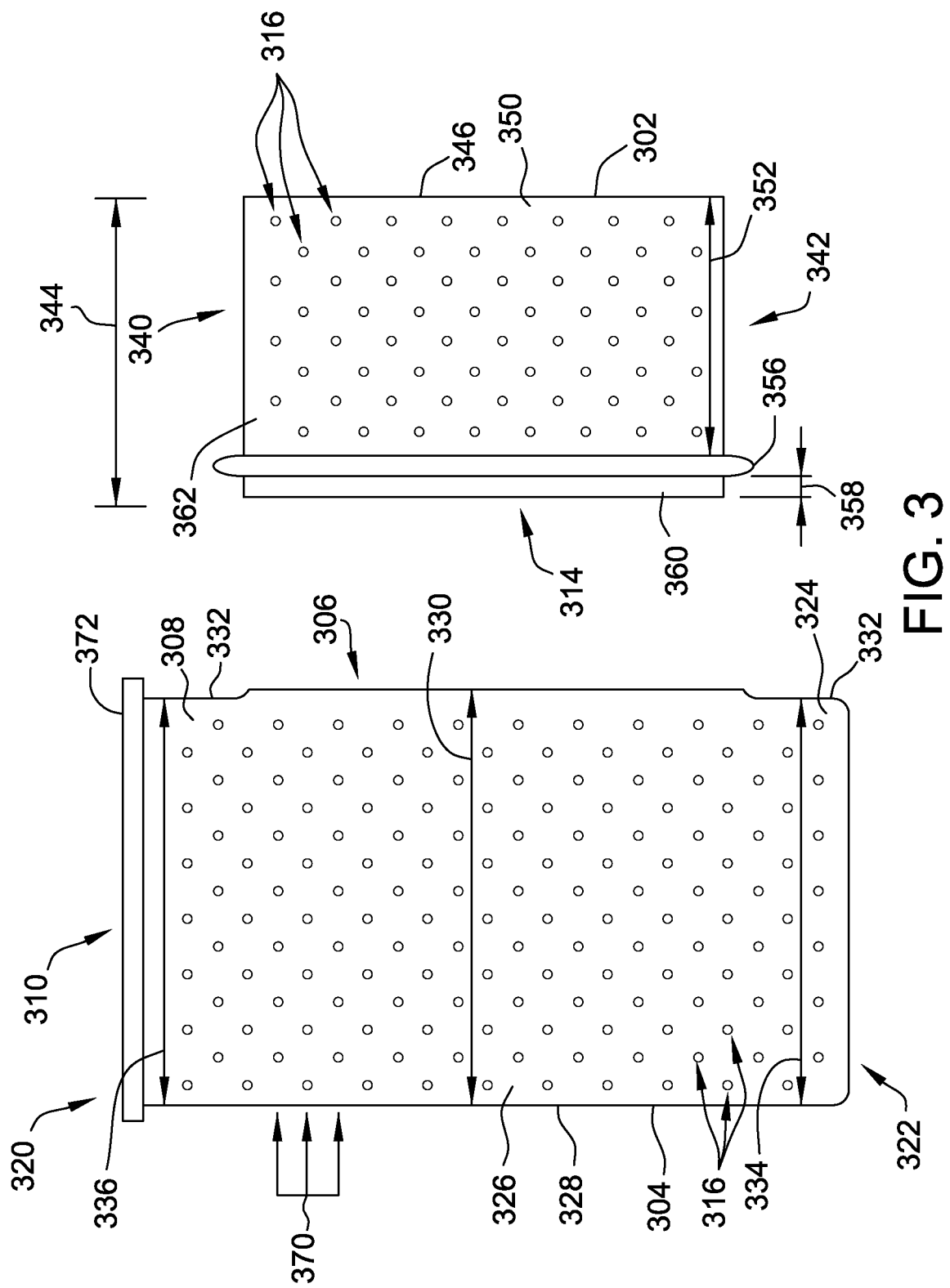
FIG. 3 is a side view of two components of an exemplary insert system for use with a stationary airfoil of the turbine stage shown in FIG. 2.
Figure 4:
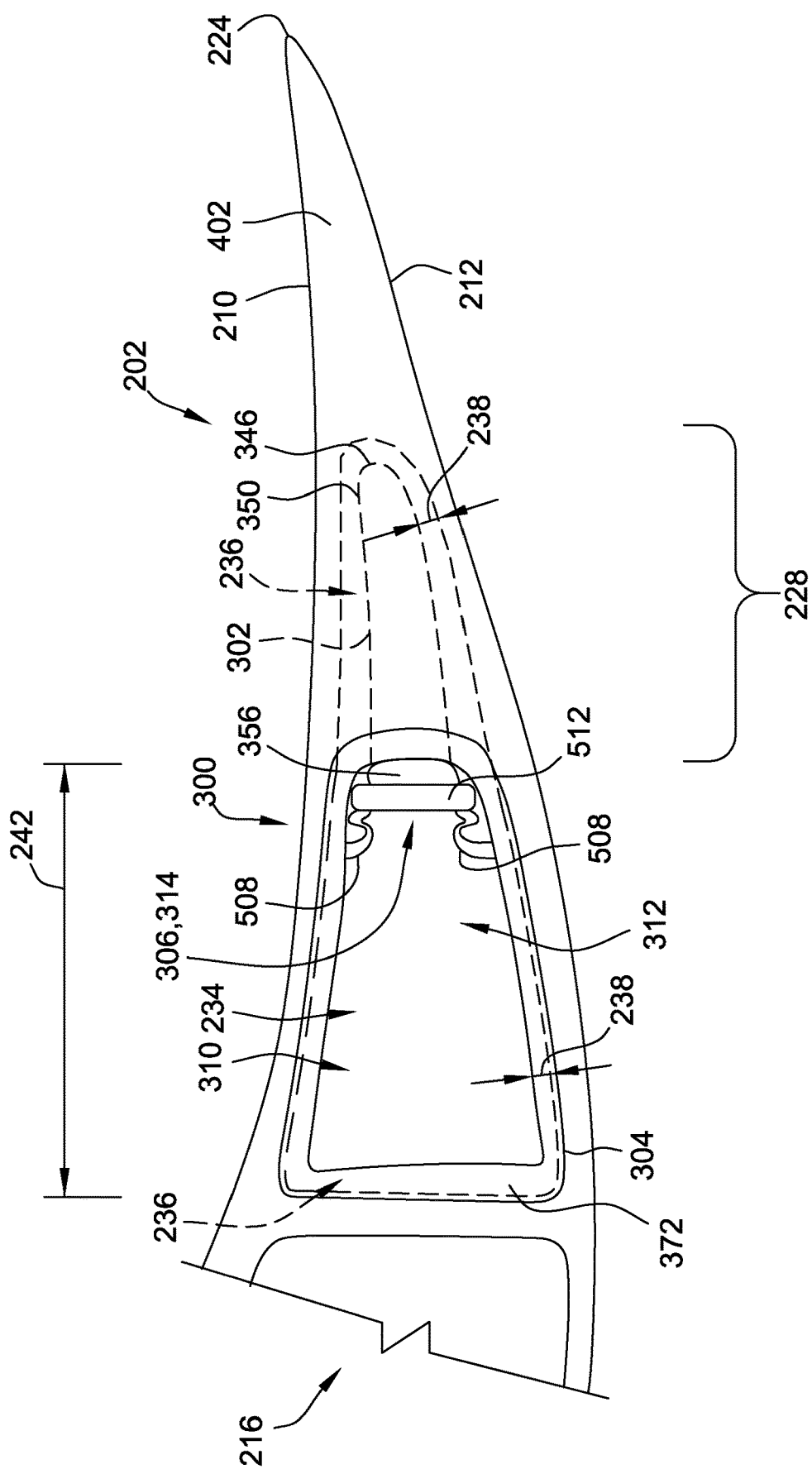
FIG. 4 is a cut-away view of an exemplary stationary airfoil having the insert system of FIG. 3 installed therein, taken along line 4-4 illustrated in FIG. 2.

FIG. 3 is a side view of two components of an exemplary insert system 300 for use with stationary airfoil 202. FIG. 4 is a cut-away view of an exemplary stationary airfoil 202 having insert system 300 installed therein, taken along line 4-4 illustrated in FIG. 2, that is, at first end 216 of stationary airfoil 202. With reference to FIGS. 3 and 4, insert system 300 includes a first insert 302 and a second insert 304. In the exemplary embodiment, first insert 302 and second insert 304 each are thin-walled hollow bodies that include a plurality of impingement openings 316 defined therein and extending therethrough. In alternative embodiments, first insert 302 and second insert 304 have any suitable structure that enables impingement openings 316 to be defined therein. Impingement openings 316 are oriented to channel cooling fluid 240 supplied through plenum inlet 234 towards the interior surfaces of pressure side wall 210 and suction side wall 212 of stationary airfoil 202.

First insert 302 and second insert 304 are sized to be inserted, either sequentially or in a nested configuration, through plenum inlet 234 into plenum 236, and configured to be coupled within plenum 236 such that first insert 302 extends axially through an aft opening 306 in second insert 304. More specifically, second insert 304 is sized for insertion into plenum 236 radially through plenum inlet 234 into an installed position, in which a neck portion 308 of second insert 304 is positioned in plenum inlet 234. Neck portion 308 defines a radial-facing inlet opening 310 of second insert 304. Radially inward of radial-facing inlet opening 310 is a cavity 312 in flow communication between radial-facing inlet opening 310 and aft opening 306. First insert 302 is sized for insertion into cavity 312 of second insert 304 radially through radial-facing inlet opening 310, and is then moveable aftward through aft opening 306 of second insert 304 into an installed position in which first insert 302 extends into aft portion 228 of stationary airfoil 202, and in which a forward-facing inlet opening 314 of first insert 302 opens into cavity 312.

In the exemplary embodiment, second insert 304 extends from a first end 320 radially inward to a second end 322. Second insert 304 includes neck portion 308 adjacent first end 320, a foot portion 324 adjacent second end 322, and a second main body portion 326 extending radially therebetween. Second main body portion 326 extends axially from a forward wall 328 to aft opening 306 and defines a second insert axial length 330. In the exemplary embodiment, second insert axial length 330 is less than a plenum inlet axial length 242 of plenum inlet 234, such that first insert 302 is insertable into, and subsequently removable from, plenum 236 radially through plenum inlet 234. In alternative embodiments, second insert axial length 330 is any suitable length that enables insert system 300 to function as described herein.

In the exemplary embodiment, foot portion 324 extends axially from forward wall 328 downstream to a second aft edge 332 and defines a foot length 334 therebetween that is less than second insert axial length 330. Similarly, neck portion 308 extends axially from forward wall 328 downstream to second aft edge 332 and defines a neck length 336 that is less than second insert axial length 330 and substantially the same as foot length 334. In alternative embodiments, lengths 330, 334, 336 are substantially the same. In other alternative embodiments, lengths 330, 334, 336 are any suitable lengths that enable insert system 300 to function as described herein.

In the exemplary embodiment, neck portion 308 defines radial-facing inlet opening 310 at first end 320. Radial-facing inlet opening 310 is configured to channel cooling fluid 240 from coolant supply channel 233 (shown in FIG. 2) into cavity 312 in an interior of second insert 304.

Moreover, in the exemplary embodiment, foot portion 324 is sealed at second end 322. In alternative embodiments, an opening (not shown) is defined at second end 322 of second insert 304, such that a portion of the received cooling fluid 240 is channeled radially inward through second end 322 into plenum 234.

In the exemplary embodiment, neck portion 308, foot portion 324, and second main body portion 326 are shaped generally congruent to a shape of a corresponding second portion of plenum 236, such that impingement openings 316 defined in second insert 304 are spaced from the interior surfaces of pressure side wall 210 and suction side wall 212 by a predetermined impingement offset 238 when second insert 304 is in the installed position. In particular, in the installed position, radial-facing inlet opening 310 defined within neck portion 308 is configured to align with, and receive cooling fluid 240 from, coolant supply channel 233 (shown in FIG. 2). Cavity 312 is located radially inward of radial-facing inlet opening 310 and extends radially from neck portion 308 to second end 322 and axially from forward wall 328 to second aft edge 332 and aft opening 306. Cavity 312 is configured to receive cooling fluid 240 channeled through radial-facing inlet opening 310 and channel cooling fluid through impingement openings 316 and aft opening 306.

In the exemplary embodiment, first insert 302 extends from a first end 340 radially inward to a second end 342. First insert 302 has a first insert axial length 344 extending axially from a first aft edge 346 to forward-facing inlet opening 314. In the exemplary embodiment, first insert axial length 344 is less than neck length 336 of second insert 304, such that first insert 302 is radially insertable through radial-facing inlet opening 310 defined within neck portion 308. Moreover, first insert 302 includes a first main body portion 350 extending radially between first end 340 and second end 342, and extending axially from first aft edge 346 a forward flange 356 over a first main body length 352. In the exemplary embodiment, first main body length 352 is less than first insert axial length 344. In alternative embodiments, first main body length 352 is the same as first insert axial length 344.

In the exemplary embodiment, first insert 302 is insertable radially through radial-facing inlet opening 310 of second insert 304 into cavity 312 and moveable aftward through aft opening 306 into the installed position such that forward-facing inlet opening 314 opens into cavity 312. For example, in the illustrated embodiment, first insert 302 is movable by sliding through aft opening 306 into the installed position. Moreover, first main body portion 350 is shaped generally congruent to a shape corresponding to aft portion 228 of stationary airfoil 202, such that impingement openings 316 defined in first insert 302 are spaced from the interior surfaces of pressure side wall 210 and suction side wall 212 by a predetermined impingement offset 238 when first insert 302 is in the installed position. In particular, in the installed position, forward-facing inlet opening 314 is configured to receive cooling fluid 240 from cavity 312 for effective impingement cooling of aft portion 228. Insert system 300 thus provides an advantage over known inserts for impingement cooling in channeling cooling fluid from plenum inlet 234 to aft portion 228, for example in embodiments in which aft portion 228 overhangs directly beneath aft supporting flange 226 (shown in FIG. 2).

In the exemplary embodiment, first insert 302 further includes forward flange 356 at least partially surrounding forward-facing inlet opening 314. In the exemplary embodiment, forward flange 356 is spaced at an offset 358 axially aftward from forward-facing inlet opening 314, such that a forward-extending portion 360 of first insert 302 is defined therebetween. As such, forward-facing inlet opening 314 is defined in forward-extending portion 360 and extends therethrough. In alternative embodiments, forward flange 356 is not offset axially aftward from forward-facing inlet opening 314.

Forward flange 356 extends outwardly from, and transversely to, an exterior surface 362 of first main body portion 350. For example, in the illustrated embodiment, forward flange 356 extends from surface 362 around an entire perimeter of first insert 302 at offset 358 from forward-facing inlet opening 314. Forward flange 356 is configured to interfere with second insert 304 when first insert 302 is moved aft through aft opening 306 into the installed position. In alternative embodiments, forward flange 356 extends outwardly from surface 362 around less than all of a perimeter of first insert 302 at offset 358 and is not continuous. In other alternative embodiments, first insert 302 does not include forward-extending portion 360 and forward flange 356 extends outwardly from a perimeter of forward-facing inlet opening 314. In still other alternative embodiments, first insert 302 does not include forward flange 356. For example, another suitable mechanism is used to position first insert 302 in the installed position with respect to second insert 304.

In the exemplary embodiment, impingement openings 316 are arranged over portions of first insert 302 and second insert 304 that face pressure side wall 210 and suction side wall 212. For example, impingement openings 316 are arranged in axially extending rows 370, and impingement openings 316 in each row 370 are radially offset, or "staggered," from impingement openings 316 in adjacent rows 370. In alternative embodiments, impingement openings 316 are arranged in any suitable fashion that enables insert system 300 to function as described herein.

In the exemplary embodiment, stationary airfoil 202 further includes a radially outer wall 402 defined between pressure side wall 210 and suction side wall 212 at first end 216, such that plenum inlet 234 is defined in radially outer wall 402 and extends therethrough. Moreover, second insert 304 includes a radially outward flange 372 configured to interface with radially outer wall 402. In the exemplary embodiment, radially outward flange 372 extends outwardly from a perimeter of radial-facing inlet opening 310, transversely to radial direction 218. For example, in the illustrated embodiment, radially outward flange 372 extends around an entire perimeter of radial-facing inlet opening 310. Radially outward flange 372 is configured to abut radially outer wall 402 when second insert 304 is properly positioned within plenum 236. Thus, radially outward flange 372 facilitates installation of second insert 304. In alternative embodiments, second insert 304 does not include radially outward flange 372.

Figure 5:
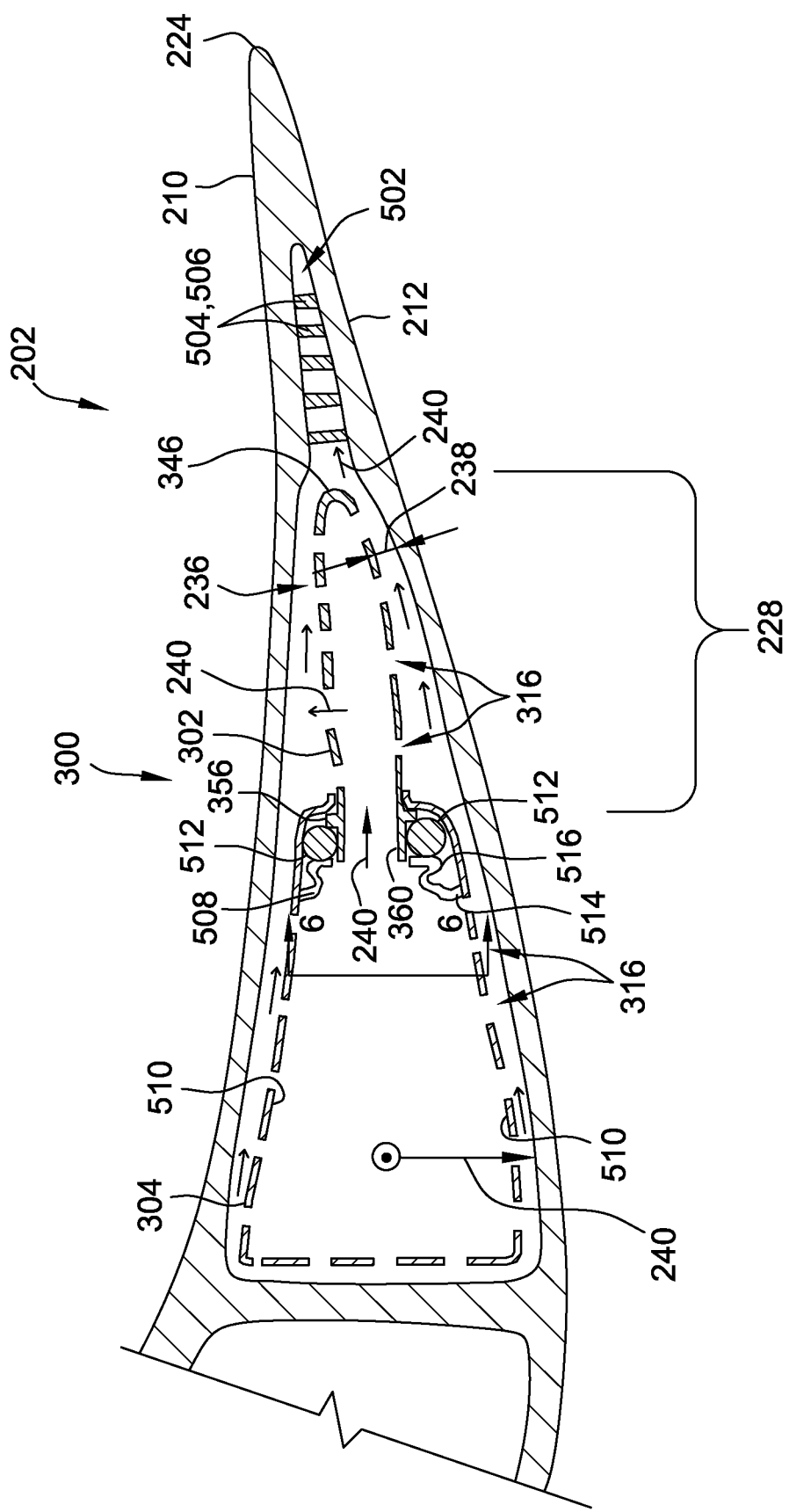
FIG. 5 is a cross-sectional view of a portion of an exemplary stationary airfoil having the insert system of FIG. 3 installed therein, taken along line 5-5 illustrated in FIG. 2.

FIG. 5 is a cross-sectional view of stationary airfoil 202 having insert system 300 installed therein, taken along line 5-5 illustrated in FIG. 2, that is, at a central span location along stationary airfoil 202. The embodiment illustrated in FIG. 5 is substantially similar to the embodiment illustrated in FIGS. 3 and 4, and like parts are numbered identically. In the exemplary embodiment, as pressure side wall 210 and suction side wall 212 taper towards each other to couple together at trailing edge 224, there is insufficient space for first insert 302 to extend aftward within plenum 236. More specifically, plenum 236 includes an aft plenum portion 502 located axially between first insert 302 and trailing edge 224. In operation, cooling fluid 240 is channeled into second insert 304 and first insert 302, and through the plurality of impingement openings 316 into impingement on the respective interior surface of pressure side wall 210 and suction side wall 212. Post-impingement, at least a portion of the flow of cooling fluid 240 is channeled aftward to aft plenum portion 502.

In the exemplary embodiment, stationary airfoil 202 includes an aft pin bank 504. Aft pin bank 504 includes a plurality of pins 506 extending between pressure side wall 210 and suction side wall 212 through aft plenum portion 502. In the exemplary embodiment, pins 506 are distributed radially along aft plenum portion 502, as well as axially, and facilitate heat exchange between post-impingement cooling fluid 240 and pressure side wall 210 and suction side wall 212 proximate to trailing edge 224. In alternative embodiments, pins 506 are distributed in any suitable fashion that enables stationary airfoil 202 to function as described herein. In other alternative embodiments, stationary airfoil 202 does not include aft pin bank 504. In the exemplary embodiment, post-impingement cooling fluid 240 is exhausted from stationary airfoil 202 through exit openings (not shown) along trailing edge 224. In alternative embodiments, post-impingement cooling fluid 240 is channeled to any other suitable location in any suitable fashion that enables stationary airfoil 202 to function as described herein.

In the exemplary embodiment, as shown in FIG. 5, second insert 304 further includes opposing attachment members 508 positioned on an inner surface 510 of second insert 304 spaced apart from, and on opposite sides of, aft opening 306. Attachment members 508 are configured such that when first insert 302 is in the installed position, attachment members 508 and forward-extending portion 360 are configured to cooperate to receive a securing member 512 therebetween. In the exemplary embodiment, attachment members 508 have substantially an "S" shape, including a forward portion 514 secured to inner surface 510 and an aft portion 516 extending aftwardly from forward portion 514. In the exemplary embodiment, aft portion 516 is resiliently deformable. More specifically, when securing member 512 is placed between attachment member 508 of second insert 304 and forward-extending portion 360 of first insert 302, aft portion 516 resiliently deforms in order to receive and secure securing member 512 between attachment member 508 and forward-extending portion 360. In other embodiments, attachment members 508 may have any shape, resiliency, and/or deformability that allows them to function as described herein. In some embodiments, attachment members 508 on opposing sides of second insert 304 are staggered radially along inner surface 510. In certain embodiments, a respective plurality of attachment members 508 are positioned on each side of second insert 304. In other alternative embodiments, insert system 300 does not include attachment member 508.

Figure 6:
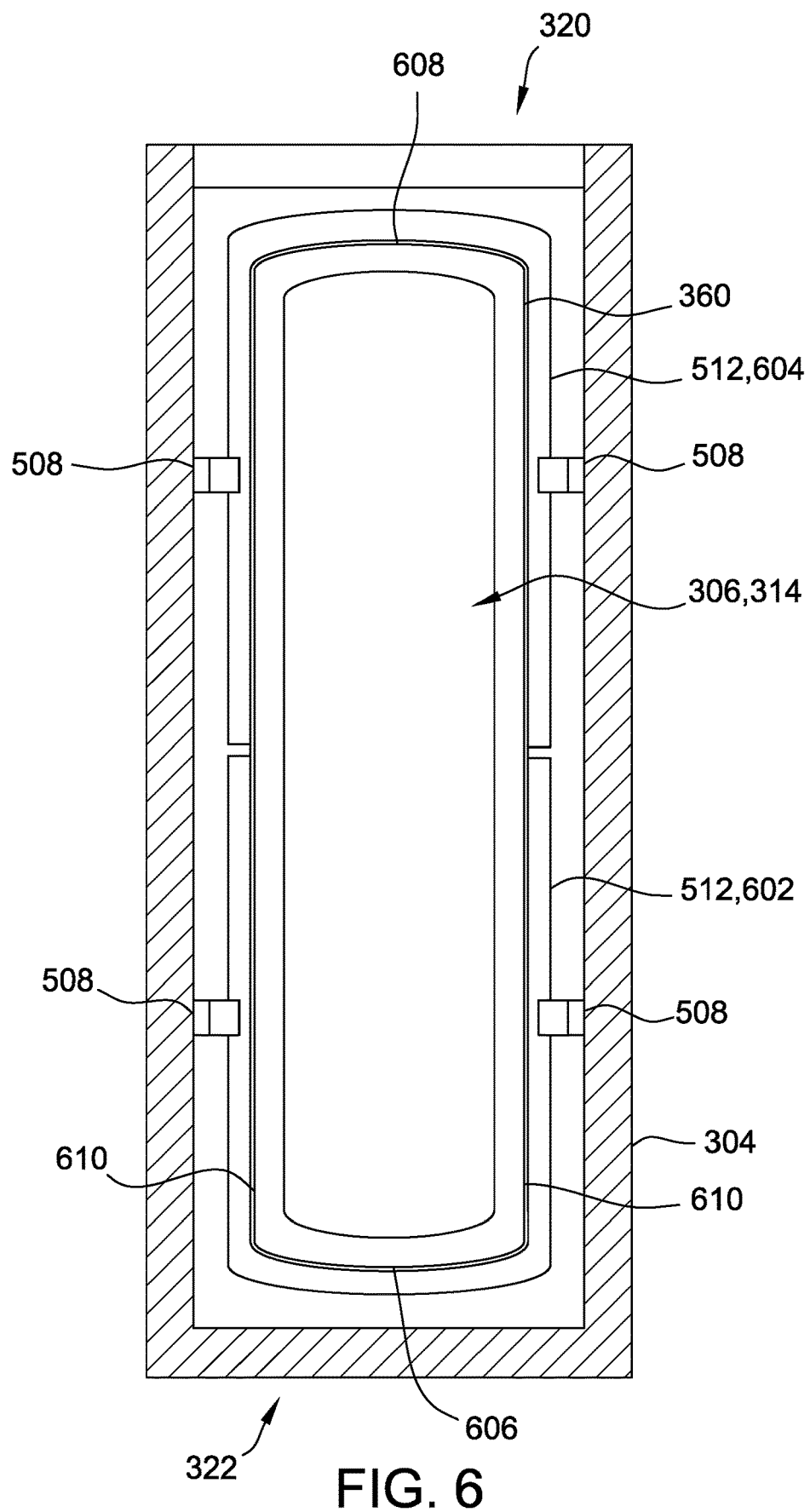
FIG. 6 is a cross-sectional view of a portion of an exemplary stationary airfoil having the insert system of FIG. 3 installed therein, taken along line 6-6 illustrated in FIG. 5.

FIG. 6 is a cross-sectional view of second insert 304 having first insert 302 installed therethrough, taken along line 6-6 illustrated in FIG. 5. The embodiment illustrated in FIG. 6 is substantially similar to the embodiment illustrated in FIGS. 3, 4 and 5, and like parts are numbered identically. Although second end 322 of second insert 304 is illustrated as sealed in FIG. 6, in alternative embodiments, as noted above, an opening (not shown) is defined at second end 322. As shown in FIG. 6, in the exemplary embodiment, securing member 512 includes a pair of U-shaped securing members 512, and more specifically, a radially inward securing member 602 and a radially outward securing member 604. Radially inward securing member 602 is configured to surround a radially inward edge 606 of forward-extending portion 360 and extend radially outward along opposing sides 610 of forward-extending portion 360. Radially inward securing member 602 is secured radially outward of radially inward edge 606 and along opposing sides 610 by two opposing attachment members 508. Similarly, radially outward securing member 604 is configured to surround a radially outward edge 608 of forward-extending portion 360 and extend radially inward along opposing sides 610 of forward-extending portion 360. Radially outward securing member 604 is secured radially inward of radially outward edge 608 and along opposing sides 610 by another two opposing attachment members 508. Radially inward securing member 602 and radially outward securing member 604, when placed between attachment members 508 and forward-extending portion 360, are configured to substantially prevent axial movement of first insert 302 relative to second insert 304. In alternative embodiments, securing member 512 has any suitable shape that enables insert system 300 to function as described herein. For example, securing member 512 may include two rods inserted along opposing sides 610 of forward-extending portion 360. In other alternative embodiments, insert system 300 does not include attachment member 508 or securing member 512.

Figure 7:
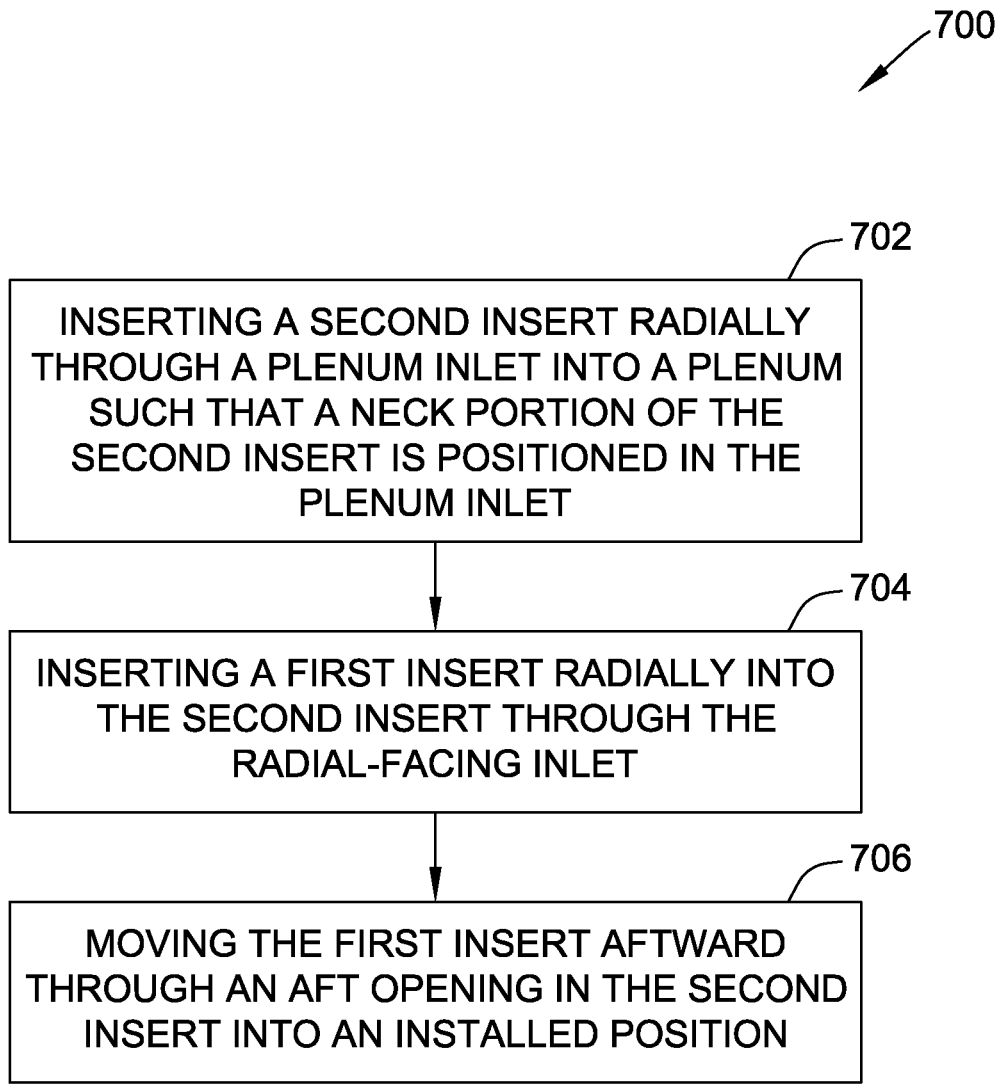
FIG. 7 is a flow diagram of an exemplary method of installing the insert system of FIG. 3.

FIG. 7 is a flow diagram of an exemplary method 700 of installing an insert system, such as insert system 300, into an airfoil, such as airfoil 202 (shown in FIGS. 2-4). The airfoil includes a plenum, such as plenum 236, that extends into an aft portion, such as aft portion 228, of the airfoil. The plenum includes a plenum inlet, such as plenum inlet 234, and the entirety of the plenum inlet is defined axially forward of the aft portion. In the exemplary embodiment, method 700 includes inserting 702 a second insert, such as second insert 304, radially through the plenum inlet such that a neck portion, such as neck portion 308, of the second insert is positioned in the plenum inlet. A radial-facing inlet, such as radial-facing inlet opening 310, of the second insert is defined in the neck portion. The second insert also includes an aft opening, such as aft opening 306. Method 700 also includes inserting 704 a first insert, such as first insert 302, radially into the second insert through the radial-facing inlet. In some embodiments, first insert 302 is inserted into second insert 304 prior to the insertion of second insert 304 into plenum 236. In other embodiments, first insert 302 is inserted into second insert 304 after the insertion of second insert 304 into plenum 236. Method 700 further includes moving 706 the first insert aftward through the aft opening into an installed position. Both the first insert and the second insert include a plurality of impingement openings, such as impingement openings 316, defined therein.

In some embodiments, the airfoil includes a radially outer wall, such as radially outer wall 402, and the plenum inlet is defined in the radially outer wall, and the second insert includes a radially outward flange, such as radially outward flange 372, extending outwardly from a perimeter of the radial-facing inlet opening. In some such embodiments, method 700 further includes inserting the second insert radially through the plenum inlet into the plenum such that the radially outward flange interfaces with the radially outer wall of the airfoil.

In certain embodiments, first insert 302 includes a forward flange, such as forward flange 356, extending around an exterior surface of the first insert, such as surface 362. In some such embodiments, moving 706 the first insert aftward through the aft opening into the installed position further includes moving the first insert aftward until the forward flange interferes with the second insert.

In some embodiments, the first insert includes a forward-extending portion, such as forward-extending portion 360, extending axially forward beyond the forward flange, the forward-facing inlet opening is defined in the forward-extending portion, and the second insert includes at least one attachment member, such as attachment member 508, spaced apart from the aft opening. In some such embodiments, method 700 further includes inserting at least one securing member, such as securing member 512, between the at least one attachment member and the forward-extending portion. Moreover, in some such embodiments, the at least one securing member includes a radially inward securing member, such as radially inward securing member 602, and a radially outward securing member, such as radially outward securing member 604. In some such embodiments, inserting the at least one securing member further includes inserting the radially inward securing member such that the radially inward securing member surrounds a radially inward edge, such as radially inward edge 606, of the forward-extending portion and extends radially outward, and inserting the radially outward securing member such that the radially outward securing member surrounds a radially outward edge, such as radially outward edge 608, of the forward-extending portion and extends radially inward.

The above described insert system for insertion through an opening in a plenum facilitates effective impingement cooling of an aft portion of an airfoil, thus decreasing the degradation associated with continual high-temperature exposure of the aft portion and increasing the longevity of the airfoil. The insert system may be particularly advantageous in airfoils in which an aft portion of the airfoil overhangs directly beneath an airfoil supporting flange, such as airfoils with a larger turning section towards the aft end. The two-insert system allows for an impingement insert to be inserted through the pre-existing plenum opening of the airfoil and then moved aft into an overhung portion of the airfoil in a simple process, allowing this aft portion to receive more effective impingement cooling. Absent the insert system of the present disclosure, an insert configuration could be substantially limited by the dimensions of the opening in the plenum.

Additionally, in particular embodiments disclosed herein, the two inserts may be supplied from a single cooling fluid supply channel. As such, a need to configure other components of the rotary machine to supply cooling fluid separately into the two different inserts is avoided. Further, in some embodiments, the inert system is removable in a simple process, facilitating ease of repair and replacement.

Additionally, an exemplary technical effect of the systems and methods described herein includes at least one of: (a) removing heat from a rotary machine component that includes an airfoil; (b) maintaining a consistent temperature gradient with the airfoil to improve component efficiency; (c) reduce amount of cooling fluids extracted from a compressor; (d) increase the coolant stream efficiency within a component region that is traditionally difficult to cool; and (e) increase rotary machine efficiency.

Exemplary embodiments of systems and methods for cooling an airfoil of a rotary machine are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine engine stationary airfoils as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insert system for an airfoil, wherein the airfoil includes a plenum that extends into an aft portion of the airfoil, wherein the plenum includes a plenum inlet, and wherein an entirety of the plenum inlet is defined axially forward of the aft portion, said insert system comprising:
   a first insert comprising:
      a forward-facing inlet opening;
      a forward flange; and
      a forward-extending portion extending axially forward beyond said forward flange, wherein said forward-facing inlet opening is defined in said forward-extending portion and extends therethrough; and
   a second insert comprising:
      a neck portion comprising a radial-facing inlet opening defined therein;
      an aft opening; and
      a cavity in flow communication between said radial-facing inlet opening and said aft opening, wherein said first insert and said second insert comprise a plurality of impingement openings defined therein, wherein said second insert is sized for insertion into the plenum radially through the plenum inlet such that said neck portion is positioned in the plenum inlet, wherein said first insert is sized for insertion into said second insert radially through said radial-facing inlet, and wherein when said neck portion is positioned in the plenum inlet, said first insert is moveable aftward through said aft opening into an installed position such that said forward-facing inlet opening opens into said cavity.

2. The insert system of claim 1, wherein the airfoil includes a radially outer wall and the plenum inlet is defined in the radially outer wall, and wherein said second insert further comprises a radially outward flange extending outwardly from a perimeter of said radial-facing inlet opening and configured to interface with the radially outer wall of the airfoil.

3. The insert system of claim 1, wherein said forward flange is configured to interfere with said second insert such that movement of said first insert through said aft opening aftward beyond the installed position is inhibited.

4. The insert system of claim 1, wherein said second insert further comprises at least one attachment member spaced apart from said aft opening, said at least one attachment member and said forward-extending portion configured to cooperate to receive at least one securing member therebetween when said first insert is in said installed position.

5. The insert system of claim 4, wherein said at least one securing member comprises a radially inward securing member and a radially outward securing member, said radially inward securing member configured to surround a radially inward edge of said forward-extending portion and extend radially outward, said radially outward securing member configured to surround a radially outward edge of said forward-extending portion and extend radially inward.

6. A gas turbine system comprising:
a compressor section;
a combustion system coupled in flow communication with said compressor section; and
a turbine section coupled in flow communication with said combustion system, wherein said turbine section comprises:
an airfoil comprising a radially outer wall and a plenum that extends into an aft portion of said airfoil, wherein said plenum includes a plenum inlet defined in said radially outer wall, and wherein an entirety of said plenum inlet is defined axially forward of said aft portion;
a first insert positioned within said plenum, said first insert comprising a first main body portion and a forward-facing inlet opening; and
a second insert positioned within said plenum, said second insert comprising:
a neck portion positioned in said plenum inlet, said neck portion comprising a radial-facing inlet opening defined therein;
a radially outward flange extending outwardly from a perimeter of said radial-facing inlet opening and configured to interface with said radially outer wall; and
an aft opening, wherein said first insert extends through said aft opening such that said first main body portion extends into said aft portion, and wherein said first insert and said second insert comprise a plurality of impingement openings defined therein.

7. The gas turbine system of claim 6, wherein said gas turbine system further comprises a casing and an aft supporting flange coupled between said casing and said airfoil, and wherein said aft portion extends directly beneath said aft supporting flange.

8. The gas turbine system of claim 6, wherein said gas turbine system is configured to channel a flow of pressurized bleed air from said compressor section to said plenum inlet.

9. The gas turbine system of claim 6, wherein said first insert further comprises a forward flange configured to interfere with said second insert such that movement of said first insert through said aft opening aftward beyond an installed position is inhibited.

10. The gas turbine system of claim 9, wherein said first insert further comprises a forward-extending portion extending axially forward beyond said forward flange, wherein said forward-facing inlet opening is defined in said forward-extending portion and extends therethrough.

11. The gas turbine system of claim 10, wherein said second insert further comprises at least one attachment member spaced apart from said aft opening, said at least one attachment member and said forward-extending portion configured to cooperate to receive at least one securing member therebetween when said first insert is in said installed position.

12. The gas turbine system of claim 11, wherein said at least one securing member comprises a radially inward securing member and a radially outward securing member, said radially inward securing member surrounding a radially inward edge of said forward-extending portion and extending radially outward, said radially outward securing member surrounding a radially outward edge of said forward-extending portion and extending radially inward.

13. The gas turbine system of claim 6, wherein said airfoil further comprises a trailing edge and an aft pin bank, and said plenum comprises an aft plenum portion located axially between said first insert and said trailing edge, wherein said aft pin bank comprises a plurality of pins extending through said aft plenum portion.

14. A method of installing an insert system into an airfoil, wherein the airfoil includes a radially outer wall and a plenum that extends into an aft portion of the airfoil, wherein the plenum includes a plenum inlet defined in the radially outer wall, and wherein an entirety of the plenum inlet is defined axially forward of the aft portion, said method comprising:
inserting a second insert radially through the plenum inlet into the plenum such that a neck portion of the second insert is positioned in the plenum inlet and a radially outward flange interfaces with the radially outward wall of the airfoil, wherein a radial-facing inlet opening of the second insert is defined in the neck portion, wherein the radially outward flange extends outwardly from a perimeter of the radial-facing inlet opening, and wherein the second insert includes an aft opening;
inserting a first insert radially into the second insert through the radial-facing inlet opening; and
moving the first insert aftward through the aft opening into an installed position, wherein the first insert and the second insert include a plurality of impingement openings defined therein.

15. The method of claim 14, wherein the first insert includes a forward flange, and wherein moving the first insert aftward through the aft opening comprises moving the first insert aftward until the forward flange interferes with the second insert.

16. The method of claim 15, wherein the first insert includes a forward-extending portion extending axially forward beyond the forward flange, wherein a forward-facing inlet opening of the first insert is defined in the forward-extending portion, wherein the second insert further includes at least one attachment member spaced apart from the aft opening, said method further comprising inserting at least one securing member between the at least one attachment member and the forward-extending portion.

17. The method of claim 16, wherein the at least one securing member includes a radially inward securing member and a radially outward securing member, wherein said inserting the at least one securing member comprises:
inserting the radially inward securing member such that the radially inward securing member surrounds a radially inward edge of the forward-extending portion and extends radially outward, and
inserting the radially outward securing member such that the radially outward securing member surrounds a radially outward edge of the forward-extending portion and extends radially inward.

* * * * *